US012627716B2

(12) United States Patent
Pardeshi et al.

(10) Patent No.: US 12,627,716 B2
(45) Date of Patent: May 12, 2026

(54) ENABLING SECURITY POLICIES ON CLOUD SECURITY PROVIDER BASED ON SD-WAN CONTEXT

(71) Applicant: Cisco Technology, Inc., San Jose, CA (US)

(72) Inventors: Shailendra Vinod Pardeshi, Dublin, CA (US); Venkatesh Nataraj, Union City, CA (US); Saravanan Radhakrishnan, Bangalore (IN); Pritam Baruah, Fremont, CA (US); Kannan Kumar, Tracy, CA (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 18/750,053

(22) Filed: Jun. 21, 2024

(65) Prior Publication Data

US 2025/0392625 A1      Dec. 25, 2025

(51) Int. Cl.
*H04L 9/40*          (2022.01)

(52) U.S. Cl.
CPC .......... *H04L 63/20* (2013.01); *H04L 63/0272* (2013.01); *H04L 63/029* (2013.01)

(58) Field of Classification Search
CPC .... H04L 63/20; H04L 63/0272; H04L 63/029
See application file for complete search history.

(56) References Cited

U.S. PATENT DOCUMENTS

| | | | | |
|---|---|---|---|---|
| 12,143,423 | B2 * | 11/2024 | Oswal | H04L 63/101 |
| 2008/0127327 | A1 * | 5/2008 | Carrasco | H04L 63/20 |
| | | | | 726/15 |

| | | | | |
|---|---|---|---|---|
| 2017/0026417 | A1 * | 1/2017 | Ermagan | H04L 63/0428 |
| 2020/0177503 | A1 * | 6/2020 | Hooda | H04L 12/4641 |
| 2020/0177550 | A1 * | 6/2020 | Valluri | H04L 63/0272 |
| 2020/0213360 | A1 * | 7/2020 | Ojha | H04L 45/24 |
| 2020/0389457 | A1 * | 12/2020 | Olofsson | H04L 63/0823 |
| 2020/0389796 | A1 * | 12/2020 | Olofsson | H04L 63/0892 |

(Continued)

FOREIGN PATENT DOCUMENTS

| | | | | |
|---|---|---|---|---|
| WO | WO-2020247224 | A1 * | 12/2020 | ........ H04L 63/0272 |
| WO | 2022216950 | A1 | 10/2022 | |

OTHER PUBLICATIONS

Aldeeb F.H.A., et al., "Software Defined Wide Area Network SD-WAN: Principles and Architecture", Researchgate, 4th International African Conference on Current Studies, published on Nov. 4, 2021, pp. 1-12.

(Continued)

*Primary Examiner* — Javier O Guzman
(74) *Attorney, Agent, or Firm* — Polsinelli P.C.

(57) ABSTRACT

The present technology provides solutions for enabling software-defined wide area network (SD-WAN) policies on a cloud security provider. An example method includes collecting, by a SD-WAN controller, contextual data associated with at least one user account of a SD-WAN, wherein the contextual data includes at least one of a virtual private network (VPN) identifier or a security group tag; and transmitting, by the SD-WAN controller, the contextual data over a secure application programming interface to a cloud security engine of a cloud network for enforcement of security policies on the cloud network based on the contextual data. Systems and computer-readable media are also provided.

20 Claims, 6 Drawing Sheets

(56) References Cited

U.S. PATENT DOCUMENTS

| | | | | |
|---|---|---|---|---|
| 2021/0136871 | A1* | 5/2021 | Bull | H04W 92/02 |
| 2021/0160251 | A1* | 5/2021 | Keisam | H04L 63/061 |
| 2021/0185011 | A1 | 6/2021 | Zhang et al. | |
| 2021/0273913 | A1* | 9/2021 | Bosch | H04L 63/0815 |
| 2021/0288881 | A1 | 9/2021 | Zhang | |
| 2021/0369309 | A1* | 12/2021 | Olofsson | H04L 67/303 |
| 2022/0209990 | A1* | 6/2022 | Dillon | H04L 12/2869 |
| 2022/0217015 | A1* | 7/2022 | Vuggrala | H04L 47/12 |
| 2023/0025586 | A1* | 1/2023 | Rolando | H04L 45/586 |
| 2023/0026865 | A1 | 1/2023 | Rolando et al. | |
| 2024/0163313 | A1* | 5/2024 | Qian | H04L 12/4641 |

OTHER PUBLICATIONS

CISCO: "Cisco SD-WAN Cloud Scale Architecture", CTI, Published on 2019, Nov. 4, 2020, 216 Pages.
International Search Report and Written Opinion for International Application No. PCT/US2025/033750, mailed Sep. 10, 2025, 13 Pages.

* cited by examiner

400

COLLECT, BY THE SD-WAN CONTROLLER, CONTEXTUAL DATA ASSOCIATED WITH THE AT LEAST ONE USER ACCOUNT, WHEREIN THE CONTEXTUAL DATA INCLUDES AT LEAST ONE OF A VIRTUAL PRIVATE NETWORK (VPN) IDENTIFIER OR A SECURITY GROUP TAG 402

TRANSMIT, BY THE SD-WAN CONTROLLER, THE SECURITY POLICIES AND THE CONTEXTUAL DATA OVER THE SIG TUNNELS TO A CLOUD SECURITY ENGINE OF A CLOUD NETWORK FOR ENFORCEMENT OF THE SECURITY POLICIES ON THE CLOUD NETWORK BASED ON THE AT LEAST ONE USER ACCOUNT 404

FIG. 4

RECEIVE, BY A CLOUD SECURITY ENGINE OF A CLOUD NETWORK, CONTEXTUAL DATA FROM A CONTROLLER OF A SD-WAN, WHEREIN THE CONTEXTUAL DATA INCLUDES AT LEAST ONE OF A VIRTUAL PRIVATE NETWORK (VPN) IDENTIFIER OR A SECURITY GROUP TAG
502

RECEIVE, BY THE CLOUD SECURITY ENGINE, A PACKET FROM A SD-WAN DEVICE OF THE SD-WAN, WHEREIN THE PACKET INCLUDES THE CONTEXTUAL DATA 504

DETERMINE, BY THE CLOUD SECURITY ENGINE, A SECURITY POLICY ASSOCIATED WITH THE CONTEXTUAL DATA 506

APPLY, BY THE CLOUD SECURITY ENGINE, THE SECURITY POLICY BASED ON THE CONTEXTUAL DATA IN THE CLOUD NETWORK 508

FIG. 5

ENABLING SECURITY POLICIES ON CLOUD SECURITY PROVIDER BASED ON SD-WAN CONTEXT

TECHNICAL FIELD

The present technology relates to enabling security policies for cloud security providers based on software-defined wide area network (SD-WAN) context and to generating and providing SD-WAN contextual data to a cloud security provider for enforcement in a cloud environment.

BACKGROUND

SD-WAN has become the de facto standard for inter-site secure WAN connectivity for digital enterprises today. SD-WAN uses a centralized controller architecture for control and data plane separation for scalability, single pane of glass management and orchestration. Secure Internet gateway (SIG)/security service edge (SSE) providers use the concept of location and sub-location as a basis for security policies. These concepts provide some degree of segmentation and micro-segmentation within a SD-WAN but are less useful in the datacenters of the SIG/SSE providers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a method for enabling SD-WAN security policies on a cloud security provider according to some aspects of the present technology.

FIG. 5 illustrates a method for enabling SD-WAN security policies on a cloud security provider according to some aspects of the present technology.

DETAILED DESCRIPTION

Figure 1:
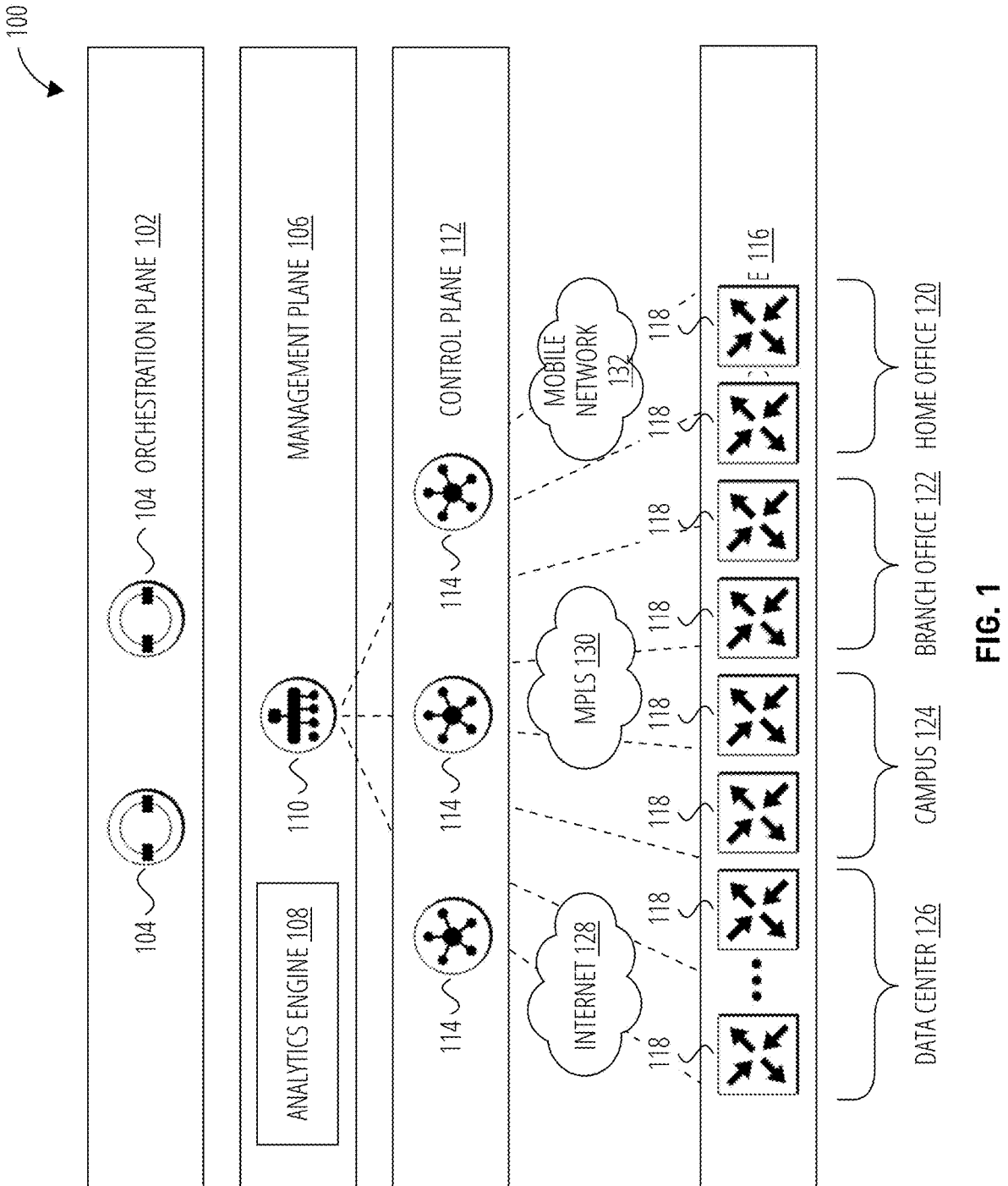
FIG. 1 illustrates an example of a high-level network architecture according to some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are systems, methods, and computer-readable media for enabling software-defined wide area network (SD-WAN) policies on a cloud security provider.

In one aspect, a method for enabling software-defined wide area network (SD-WAN) policies on a cloud security provider, the method includes collecting, by a SD-WAN controller, contextual data associated with at least one user account of a SD-WAN, wherein the contextual data includes at least one of a virtual private network (VPN) identifier or a security group tag, and transmitting, by the SD-WAN controller, the contextual data over a secure application programming interface to a cloud security engine of a cloud network for enforcement of security policies on the cloud network based on the contextual data.

In another aspect, the method can also include setting, by the SD-WAN controller, the security policies for the SD-WAN, wherein the security policies are associated with the at least one user account, and transmitting, by the SD-WAN controller, the security policies over the secure application programming interface to the cloud security engine for enforcement of the security policies on the cloud network based on the contextual data.

In another aspect, the security group tag is associated with a user profile.

In another aspect, the method can also include updating, by the SD-WAN controller, a database storing the contextual data, and transmitting, by the SD-WAN controller, an update of the database over the secure application programming interface to the cloud security engine of the cloud network for enforcement of the security policies on the cloud network based on the contextual data.

In another aspect, the contextual data is inserted into a metadata header of an Internet Protocol Security (IPsec) payload of a packet associated with the at least one user account as the at least one user account accesses the SD-WAN.

In another aspect, the packet is received by the cloud security engine from a SD-WAN device associated with the at least one user account through a secure Internet gateway (SIG) tunnel established between the SD-WAN device and the cloud security engine.

In another aspect, enforcement of the security policies includes the cloud security engine decrypting the packet to determine the contextual data.

In another aspect, the security policies are defined using the contextual data.

In another aspect, the VPN identifier is associated with a location or a sub-location.

In one aspect, a non-transitory computer-readable storage medium including instructions that when executed by a processor, cause the processor to collect, by a SD-WAN controller, contextual data associated with at least one user account of a SD-WAN, wherein the contextual data includes at least one of a virtual private network (VPN) identifier or a security group tag, and transmit, by the SD-WAN controller, the contextual data over a secure application programming interface to a cloud security engine of a cloud network for enforcement of security policies on the cloud network based on the contextual data.

In one aspect, a system includes a processor and a memory storing instructions that, when executed by the processor, cause the processor to collect, by a SD-WAN controller, contextual data associated with at least one user account of a SD-WAN, wherein the contextual data includes at least one of a virtual private network (VPN) identifier or a security group tag, and transmit, by the SD-WAN controller, the contextual data over a secure application programming interface to a cloud security engine of a cloud network for enforcement of security policies on the cloud network based on the contextual data.

In one aspect, a method for enabling software-defined wide area network (SD-WAN) policies on a cloud security provider, the method includes receiving, by a cloud security engine of a cloud network, contextual data from a controller of a SD-WAN, wherein the contextual data includes at least one of a virtual private network (VPN) identifier or a security group tag, receiving, by the cloud security engine, a packet from a SD-WAN device of the SD-WAN, wherein the packet includes the contextual data, determining, by the cloud security engine, a security policy associated with the contextual data, and applying, by the cloud security engine, the security policy based on the contextual data in the cloud network.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

Description

Software-defined wide area networks (SD-WANs) are a type of networking technology based on software-defined networking (SDN) principles to optimize the performance of wide area networks (WANs).

Current secure Internet gateways (SIG) and security service edge (SSE) providers use the concepts of location and sub-location as a basis for security policies. This allows customers to assign their sites a "location" and a "sub-location," which can be mapped to a security policy.

Some organizations and/or corporations have complex segmentation and security groups configured within their software-defined wide area networks (SD-WANs). Current technologies are unable to extend the intricacies of such segmentation and micro-segmentation to other environments. The important context of segmentation (e.g., for virtual private networks (VPNs)) and micro-segmentation (e.g., using security group tags (SGTs)) in the SD-WAN are lost when packets exit the SD-WAN fabric via the SIG/SSE tunnels to the datacenters of the SIG/SSE providers. Consequently, policy enforcement on the SSE/SIG is applicable to all of the traffic landing on the SIG/SSE provider datacenters. More specifically, all traffic from a location will be subjected to the same policy and the policies will not have any contextual rules.

These issues and shortcomings of current technologies cause the entities having complex segmentation and micro-segmentation to desire consistency of security policies within both their own SD-WAN domain and in SIG/SSE domains.

These problems are further compounded by additional structural issues that prevent sharing. For example, customers might want to use multiple SIG/SSE providers in different sites, so a common method is desired to share information that enables policy definition. As another example, policy enforcement needs per-packet metadata, but standard IPsec or GRE does not support sharing of metadata.

Standard IPsec and GRE do not support standard formats such as Network Service Header (NSH) or Geneve. Furthermore, NSH cannot be used across network domains and neither of them are efficient on a forwarding plane. Furthermore, all SIG/SSEs only support standard IPsec or GRE. Per-packet context cannot be associated with the inner packet because the inner IP header may not be accessible to the SIG/SSE provider and the inner fields may need to be used for deep packet inspection and are hence not modifiable. Extracting context from inner packets is sometimes not allowed for confidentiality and/or performance reasons, which means that context must be associated to the outer packet (e.g., the tunnel header).

The present technology provides solutions for enabling security policies on SSE/SIG cloud security providers. The present technology addresses both policy definition and policy enforcement to enable security policies on SSE/SIG cloud security providers based on SD-WAN context. For defining policies, the present technology provides a public application programming interface (API) to pull VPN and SGT context from a controller of the SD-WAN. The API can be accessible based on authentication credentials provided to customers. This can potentially be used by multiple SIG/SSE providers from the user accounts. Additionally, the API is able to push VPN and SGT context to an SSE/SIG based on account information inputted to a controller orchestrator.

For policy enforcement, the present technology provides an interface for integrating metadata into standard IPsec and standard GRE packets. As discussed above, all SIGs support standard IPsec and GRE, which do not currently support metadata of any kind. By utilizing a highly efficient type length value (TLV), which is supported by standard IPsec and GRE, the present technology is able to provide the contextual data of the SD-WAN to the cloud security providers.

Using the two interfaces above, an SD-WAN administrator can define and enforce policies using VPN or SGT contexts so that there is consistent security policies and posture achieved across both the SD-WAN domain and the SIG/SSE domain. For example, extending the SD-WAN context to the SIG provider can be performed via control plane and/or data plane methodologies. On the control plane, the controller can establish a secure connection using the SIG provider credentials. The context (e.g., VPN identifier and/or SGT) can be communicated to the SIG provider via REST APIs across the secure connection. The context transmitted is useful information that enables the provider to work with and offer various methodologies to enforce security based on this context to the customer. For example, security based on segmentation, security based on micro-segmentation, and monitoring and advanced visibility from SIG to the controller.

Additionally, the VPN identifiers and SGT data can be stored in a database that is continuously updated. When there are changes to the VPN and SGT database, the updates can be communicated from the controller to the SIG provider. The SIG provider portal can utilize the contextual data from the SD-WAN fabric and updates thereof as one of the identifies to match against security policies that are defined. These security policies can be propagated to all of the datacenters where the security policies could be enforced.

On the data plane, the SD-WAN context will be sent in a packet to the SIG provider by inserting the metadata header in the packet as part of the IPsec payload, which ensures that the data is secured by IPsec encryption. The SIG provider can receive the packet and decrypt the packet. Post IPsec decryption, the SIG provider can extract the context from the metadata header and utilize the contextual data for policy enforcement on the data plane of the cloud network.

Turning now to the figures, FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances (e.g., network orchestrator appliances 104). The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances (e.g., network management appliances 110). In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110. The management plane 106 can include an analytics engine 108 to provide analytics for the network.

The control plane 112 can build and maintain a network topology and make decisions on where traffic flows. The control plane 112 can include one or more physical or virtual network control appliances (e.g., network control appliances 114). The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more of internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2:
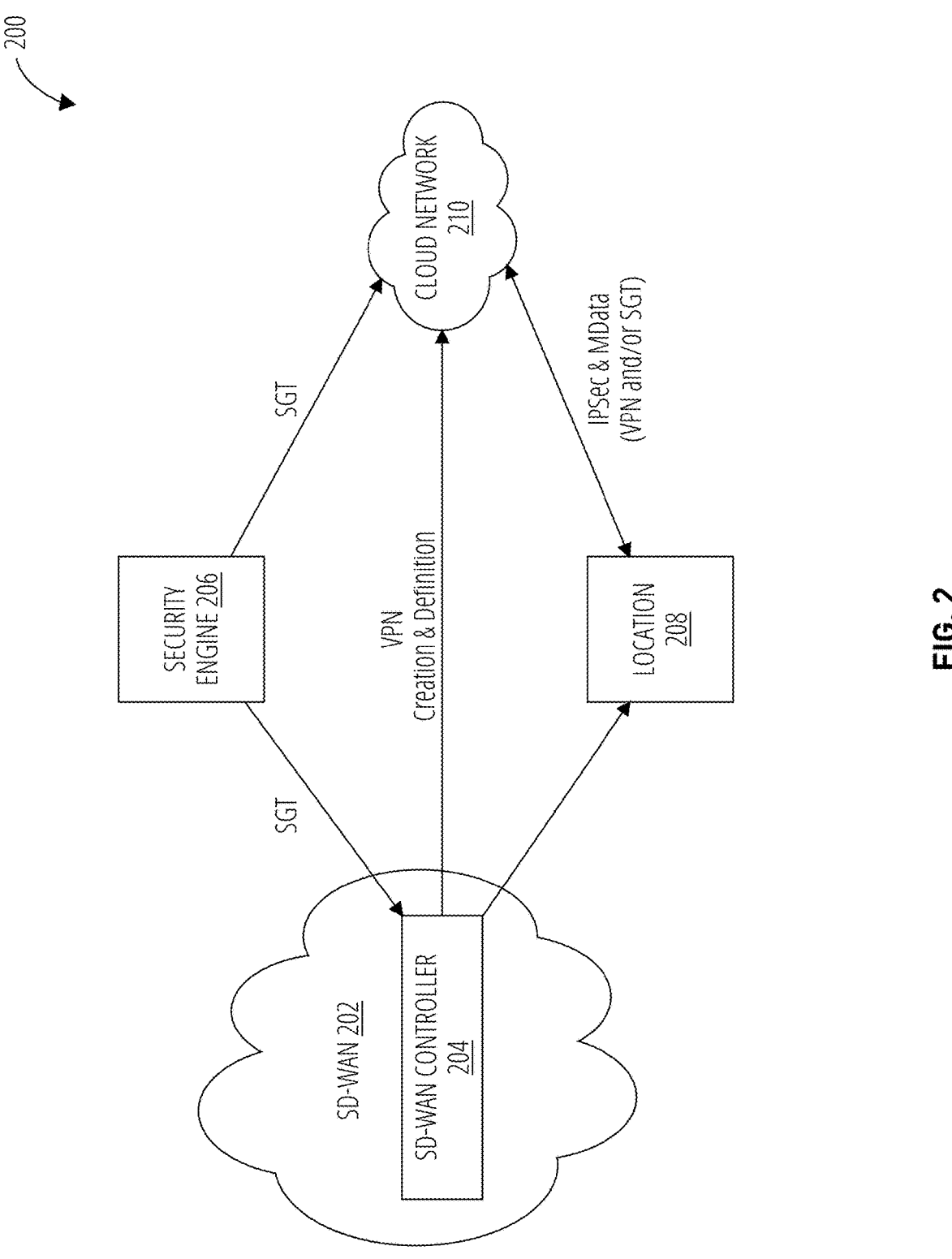
FIG. 2 illustrates an example environment for sharing SD-WAN context to a cloud network according to some aspects of the present technology.

FIG. 2 illustrates an example environment 200 for sharing SD-WAN context to a cloud network for consistent enforcement of security policies associated with the SD-WAN on the cloud network. The environment 200 comprises an SD-WAN 202, a security engine 206, a location 208, and a cloud network 210.

SD-WAN 202 is a network that entities can define as discussed above. SD-WAN 202 can include an SD-WAN controller 204 configured to establish secure connections and other functions as discussed above with respect to the network orchestrator appliances 104, network management appliances 110, network control appliances 114 of FIG. 1. For example, SD-WAN controller 204 is configured to transmit contextual data to a security engine 206 using a secure API.

For example SD-WAN controller 204 is configured to create, define, and transmit VPN identifiers to cloud network 210 (e.g., using a secure API). The VPN identifiers can be used to group users together. For example, the VPN identifiers can identify a specific location (e.g., location 208)

and/or sub-locations of various branches of an entity. For example, a company may have a physical office in Los Angeles and another office in San Francisco. The VPN identifiers can provide segmentation based on the locations (and/or sub-locations). For example, employees of the Los Angeles office or employees working in the Los Angeles office may be granted access to some files or applications, while denied access to others. Similarly, employees working in the San Francisco office may be granted access to different files or applications. Security policies can be created, defined, and enforced to provide varying access and rights to different locations, sub-locations, and/or other groups of users (e.g., departments, teams, roles, titles, etc.). As users access the SD-WAN 202, the SD-WAN controller 204 can collect contextual data including the VPN identifier and/or SGT of the user and subsequently provide the contextual data to the cloud network 210 for enforcement thereon.

Security engine 206 is configured to manage security policies and provide secure network access to end users and devices. The security engine 206 enables the creation and enforcement of security and access policies for endpoint devices that are connected to the SD-WAN 202 and the cloud network 210. In some embodiments, the security engine 206 can receive security policies through a secure API for execution on and/or by the security engine 206. For example, the security policies can be applied on packets received through SIG tunnels between the security engine 206 and SD-WAN devices. Additionally, the security engine 206 is configured to enable micro-segmentation using SGTs associated with user profiles. For example, a first end user may have access to a first subset of files, while a second end user may have access to a second subset of files. The security engine can create and enforce policies that grant access to the first subset of files and deny access to the second subset of files based on a first SGT associated with a user profile of the first end user, while simultaneously granting access to the second subset of files and denying access to the first subset of files based on a second SGT associated with a user profile of the second end user.

Figure 3:
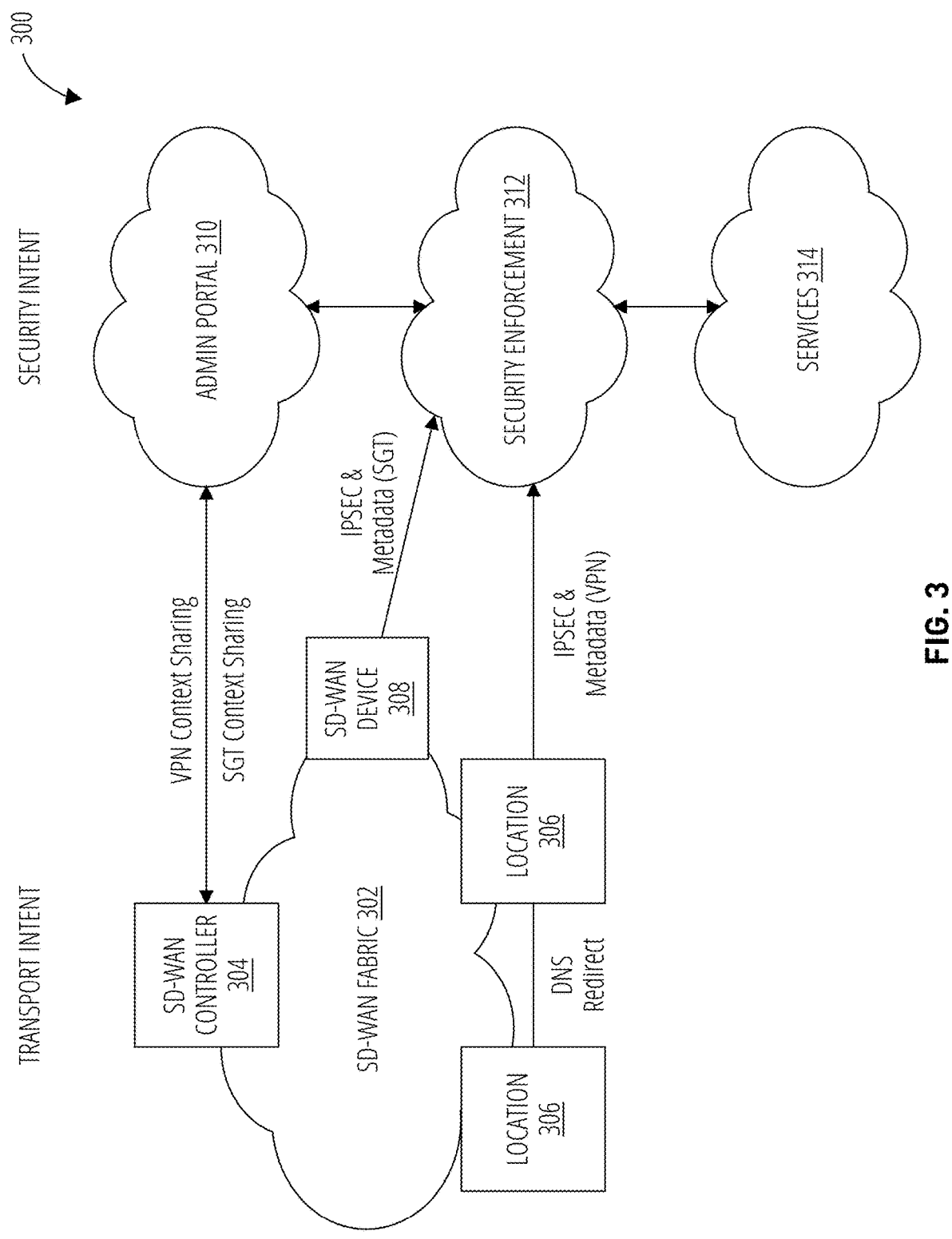
FIG. 3 illustrates an example environment for sharing SD-WAN context to a cloud network according to some aspects of the present technology.

FIG. 3 illustrates an example environment 300 for sharing SD-WAN context to a cloud network for consistent enforcement of security policies associated with the SD-WAN on the cloud network. The environment 300 comprises an SD-WAN fabric 302, locations 306, SD-WAN devices 308, an admin portal 310, security enforcement 312, and services 314.

As discussed above, SD-WAN fabric 302 is configured with an SD-WAN controller 304. SD-WAN controller 304 includes at least one of the network orchestrator appliances 104, network management appliances 110, and/or network control appliances 114 described above with respect to FIG. 1. For example, vManage can be configured to establish secure connections with an admin portal 310 using Domain Name System (DNS) redirecting, Extension Mechanisms for DNS (EDNS), Local Domain Bypass, IPsec, and other protocols. Additionally, the SD-WAN controller 304 can share VPN context including VPN identifiers (e.g., of locations 306) to the admin portal 310.

As users access the SD-WAN fabric 302 and/or an associated cloud network through locations 306, the contextual data of the users and the location 306 is provided to security enforcement 312. For example, IPsec packets can be sent to security enforcement 312 with the VPN identifier for the location 306 as metadata in TLV headers and/or payloads of the IPsec packets. Similarly, as users access the SD-WAN fabric 302 and/or an associated cloud network through SD-WAN devices 308, the contextual data of the user and a respective SGT are provided to security enforcement 312. For example, as the SD-WAN devices 308 send IPsec packets to security enforcement 312, the SD-WAN devices 308 can include the respective SGT as metadata in TLV headers and/or payloads of the IPsec packets. By providing the VPN identifier and/or respective SGT as metadata in the IPsec packets, the VPN identifier and/or respective SGT will be secured by IPsec encryption. Security enforcement 312 can be configured to decrypt the IPsec encryption to extract and use the metadata for policy enforcement.

An administrator can utilize admin portal 310 to define security policies for enforcement by security enforcement 312. The security policies can be created and/or defined based on context obtained in the SD-WAN fabric 302. For example, the security policies can be based on VPN identifiers and/or SGTs of users of the SD-WAN fabric 302. The security policies are provided to security enforcement 312 for enforcement in a cloud network. For example, an administrator can grant access to users associated with a first VPN identifier and/or SGT to a first subset of services 314, while denying access to a second subset of services 314. Security enforcement 312 can apply the policies to ensure that users with the first VPN identifier and/or SGT can access the first subset of services 314 but not the second subset of services 314.

FIG. 4 illustrates an example method 400 for enabling security policies on SSE/SIG cloud security providers based on contextual data in an SD-WAN. For example, FIG. 4 illustrates method 400 enabling software-defined wide area network (SD-WAN) policies on a cloud security provider. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

At block 402, method 400 includes collecting, by a SD-WAN controller, contextual data associated with at least one user account of a SD-WAN, wherein the contextual data includes at least one of a virtual private network (VPN) identifier or a security group tag. In some embodiments, the VPN identifier is associated with a location or a sub-location. In some embodiments, the security group tag is associated with a user profile. In some embodiments, the contextual data is inserted into a metadata header of an Internet Protocol Security (IPsec) payload of a packet associated with the at least one user account as the at least one user account accesses the SD-WAN.

In some embodiments, method 400 can include setting, by the SD-WAN controller, the security policies for the SD-WAN, wherein the security policies are associated with the at least one user account.

At block 404, method 400 includes transmitting, by the SD-WAN controller, the contextual data over a secure application programming interface to a cloud security engine of a cloud network for enforcement of the security policies on the cloud network based on the contextual data. In some embodiments, the security policies are defined using the contextual data.

In some embodiments, method 400 can include transmitting, by the SD-WAN controller, the security policies over the secure application programming interface to the cloud security engine for enforcement of the security policies on the cloud network based on the contextual data.

In some embodiments, the packet is received by the cloud security engine from a SD-WAN device associated with the at least one user account through a secure Internet gateway (SIG) tunnel established between the SD-WAN device and the cloud security engine. In some embodiments, enforcement of the security policies includes the cloud security engine decrypting the packet to determine the contextual data.

In some embodiments, method 400 can include updating, by the SD-WAN controller, a database storing the contextual data. Additionally, method 400 can include transmitting, by the SD-WAN controller, an update of the database over the secure application programming interface to the cloud security engine of the cloud network for enforcement of the security policies on the cloud network based on the contextual data.

FIG. 5 illustrates an example method 500 for enabling security policies on SSE/SIG cloud security providers based on contextual data in an SD-WAN. For example, FIG. 5 illustrates method 500 enabling software-defined wide area network (SD-WAN) policies on a cloud security provider. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At block 502, method 500 includes receiving, by a cloud security engine of a cloud network, contextual data from a controller of a SD-WAN, wherein the contextual data includes at least one of a virtual private network (VPN) identifier or a security group tag. In some embodiments, the security group tag is associated with a user profile. In some embodiments, the contextual data is received via a secure application programming interface.

At block 504, method 500 includes receiving, by the cloud security engine, a packet from a SD-WAN device of the SD-WAN, wherein the packet includes the contextual data. In some embodiments, the packet is associated with a user account as the user account accesses the SD-WAN. In some embodiments, the packet is received via a SIG tunnel established between the SD-WAN device and cloud security engine.

In some embodiments, method 500 can include extracting, by the cloud security engine, the contextual data from a metadata header inserted into an IPsec payload of the packet. For example, the cloud security engine can decrypt the IPsec payload of the packet to extract the contextual data.

At block 506, method 500 includes determining, by cloud security engine, a security policy associated with the contextual data. In some embodiments, the security policy is a security policy defined in the SD-WAN. In some embodiments, the security policy is determined based on the contextual data. In some embodiments, determining the security policy includes matching the contextual data with a plurality of security policies. In some embodiments, method 500 can include defining, by the cloud security engine, the security policy using the contextual data.

At block 508, method 500 includes applying, by the cloud security engine, the security policy in the cloud network based on the contextual data.

In some embodiments, method 500 can include receiving, by the cloud security engine, an update to a database storing the contextual data from the controller of the SD-WAN.

Figure 6:
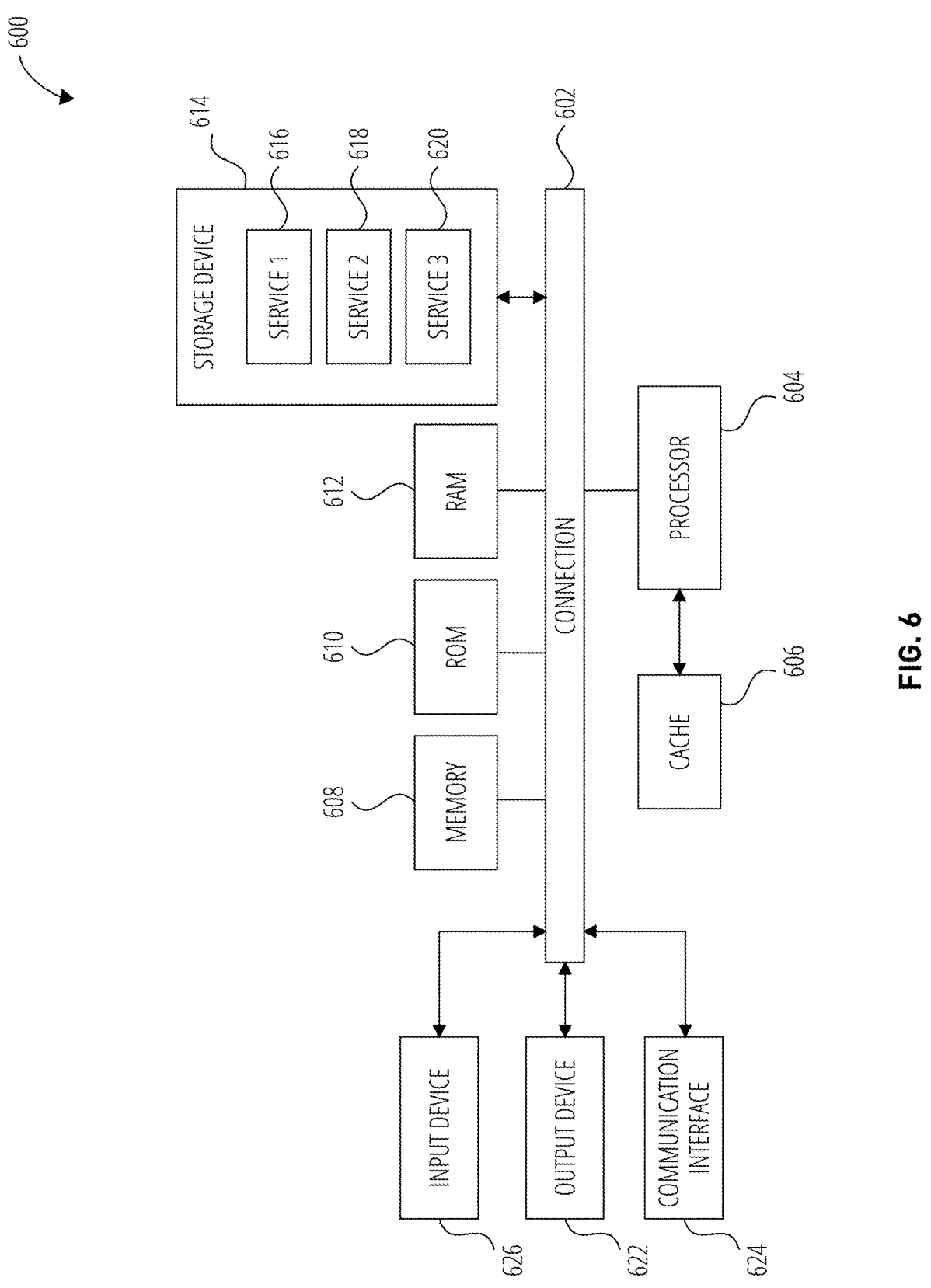
FIG. 6 shows an example of a system for implementing certain aspects of the present technology.

FIG. 6 shows an example of computing system 600, which can be for example any computing device making up network architecture 100, environment 200, environment 300, or any component(s) thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor 604) and connection 602 that couples various system components including system memory 608, such as read-only memory (ROM 610) and random access memory (RAM 612) to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for enabling software-defined wide area network (SD-WAN) policies on a cloud security provider, the method comprising:

collecting, by a SD-WAN controller, contextual data associated with at least one user account of a SD-WAN, wherein the contextual data includes at least one of a virtual private network (VPN) identifier or a security group tag; and transmitting, by the SD-WAN controller, the contextual data over a secure application programming interface to a cloud security engine of a cloud network for enforcement of security policies on the cloud network based on the contextual data.

2. The method of claim 1, further comprising:

setting, by the SD-WAN controller, the security policies for the SD-WAN, wherein the security policies are associated with the at least one user account; and transmitting, by the SD-WAN controller, the security policies over the secure application programming interface to the cloud security engine for enforcement of the security policies on the cloud network based on the contextual data.

3. The method of claim 1, wherein the security group tag is associated with a user profile.

4. The method of claim 1, further comprising:

updating, by the SD-WAN controller, a database storing the contextual data; and transmitting, by the SD-WAN controller, an update of the database over the secure application programming interface to the cloud security engine of the cloud network for enforcement of the security policies on the cloud network based on the contextual data.

5. The method of claim 1, wherein the contextual data is inserted into a metadata header of an Internet Protocol Security (IPsec) payload of a packet associated with the at least one user account as the at least one user account accesses the SD-WAN.

6. The method of claim 5, wherein the packet is received by the cloud security engine from a SD-WAN device associated with the at least one user account through a secure Internet gateway (SIG) tunnel established between the SD-WAN device and the cloud security engine.

7. The method of claim 5, wherein enforcement of the security policies includes the cloud security engine decrypting the packet to determine the contextual data.

8. The method of claim 1, wherein the security policies are defined using the contextual data.

9. The method of claim 1, wherein the virtual private network (VPN) identifier is associated with a location or a sub-location.

10. A non-transitory computer-readable storage medium including instructions that, when executed by a processor, cause the processor to:

collect, by a SD-WAN controller, contextual data associated with at least one user account of a SD-WAN, wherein the contextual data includes at least one of a virtual private network (VPN) identifier or a security group tag; and transmit, by the SD-WAN controller, the contextual data over a secure application programming interface to a cloud security engine of a cloud network for enforcement of security policies on the cloud network based on the contextual data.

11. The non-transitory computer-readable storage medium of claim 10, wherein the instructions further configure the processor to:

set, by the SD-WAN controller, the security policies for the SD-WAN, wherein the security policies are associated with the at least one user account; and transmit, by the SD-WAN controller, the security policies over the secure application programming interface to the cloud security engine for enforcement of the security policies on the cloud network based on the contextual data.

12. The non-transitory computer-readable storage medium of claim 10, wherein the security group tag is associated with a user profile.

13. The non-transitory computer-readable storage medium of claim 10, wherein the instructions further configure the processor to:

update, by the SD-WAN controller, a database storing the contextual data; and transmit, by the SD-WAN controller, an update of the database over the secure application programming interface to the cloud security engine of the cloud network for enforcement of the security policies on the cloud network based on the contextual data.

14. The non-transitory computer-readable storage medium of claim 10, wherein the contextual data is inserted into a metadata header of an Internet Protocol Security (IPsec) payload of a packet associated with the at least one user account as the at least one user account accesses the SD-WAN.

15. The non-transitory computer-readable storage medium of claim 14, wherein the packet is received by the cloud security engine from a SD-WAN device associated with the at least one user account through a secure Internet gateway (SIG) tunnel established between the SD-WAN device and the cloud security engine.

16. The non-transitory computer-readable storage medium of claim 14, wherein enforcement of the security policies includes the cloud security engine decrypting the packet to determine the contextual data.

17. The non-transitory computer-readable storage medium of claim 10, wherein the security policies are defined using the contextual data.

18. The non-transitory computer-readable storage medium of claim 10, wherein the virtual private network (VPN) identifier is associated with a location or a sub-location.

19. A system comprising:

a processor; and a memory storing instructions that, when executed by the processor, cause the processor to:

collect, by a SD-WAN controller, contextual data associated with at least one user account of a SD-WAN, wherein the contextual data includes at least one of a virtual private network (VPN) identifier or a security group tag; and transmit, by the SD-WAN controller, the contextual data over a secure application programming interface to a cloud security engine of a cloud network for enforcement of security policies on the cloud network based on the contextual data.

20. The system of claim 19, wherein the instructions, when executed by the processor, further cause the processor to:

set, by the SD-WAN controller, the security policies for the SD-WAN, wherein the security policies are associated with the at least one user account; and transmit, by the SD-WAN controller, the security policies over the secure application programming interface to the cloud security engine for enforcement of the security policies on the cloud network based on the contextual data.

* * * * *